United States Patent
King et al.

[11] Patent Number: 6,156,356
[45] Date of Patent: Dec. 5, 2000

[54] PIZZA POP-UP TOASTER PRODUCT

[76] Inventors: K. Michael King, 64 N. Main St., Geneva, N.Y. 14456; Aimee Eopechino, 145 Coddington Rd., Ithaca, N.Y. 14850; Aaron Keith Edwards, 190 Pleasant Grove Rd., Apt. P-2; Susan Patricia Connell, 614 E. Buffalo St., Apt. #7, both of Ithaca, N.Y. 14850; Ellen Kate Chamberlain, 64 N. Main St., Geneva, N.Y. 14456; John L. Brent, Jr., 2139 Blue Hills Rd., Manhattan, Kans. 66502; Mary Elizabeth Gangloff, 2250 N. Triphammer Rd., Apt. N3A, Ithaca, N.Y. 14850; Lanette Marie Shaffer, 31356 Tucker St. NE., Cambridge, Minn. 55008; Joanne Marie Langdon, 1450 Rte. 7A, Copake, N.Y. 12516

[21] Appl. No.: 08/727,144

[22] Filed: Oct. 8, 1996

Related U.S. Application Data

[60] Provisional application No. 60/018,974, Jun. 4, 1996, and provisional application No. 60/019,076, Jun. 3, 1996.

[51] Int. Cl.[7] .............................. A21D 13/00; A21D 10/04
[52] U.S. Cl. .............................. 426/94; 426/95; 426/100; 426/283; 426/551; 426/553; 426/589
[58] Field of Search .............................. 426/283, 95, 100, 426/551, 589, 99, 553

[56] References Cited

U.S. PATENT DOCUMENTS

| | | |
|---|---|---|
| 3,615,679 | 10/1971 | Tangel et al. .............................. 426/62 |
| 3,767,823 | 10/1973 | Wheeler et al. . |
| 4,020,188 | 4/1977 | Forkner . |
| 4,271,200 | 6/1981 | Hempenius et al. . |
| 4,562,080 | 12/1985 | Tenn . |
| 4,649,053 | 3/1987 | Lamonica . |
| 4,693,899 | 9/1987 | Hong et al. .............................. 426/94 |
| 4,707,374 | 11/1987 | King et al. . |
| 4,721,622 | 1/1988 | Kingham et al. . |
| 4,963,377 | 10/1990 | Rimmeir . |
| 5,171,599 | 12/1992 | Weber . |
| 5,190,780 | 3/1993 | Fehr et al. . |
| 5,202,138 | 4/1993 | Stypula .............................. 426/94 |
| 5,223,292 | 6/1993 | Thulin . |
| 5,348,751 | 9/1994 | Packer et al. . |
| 5,382,440 | 1/1995 | Sullivan . |
| 5,455,059 | 10/1995 | McFeaters . |
| 5,549,923 | 8/1996 | Finnochiaro . |
| 5,554,406 | 9/1996 | Munez et al. . |

OTHER PUBLICATIONS

Marcos, A., Cheese: Chemistry, Physics and Microbiology, vol. 1 "General Aspects" Chapman Hall, Gaithersburg, MD, 1999.

*Primary Examiner*—Bennett Celsa
*Assistant Examiner*—Joseph W. Ricigliano
*Attorney, Agent, or Firm*—Scully, Scott, Murphy & Presser

[57] ABSTRACT

This instant invention is directed to a precooked pizza pop-up toaster product designed to be sold in the frozen state for consumers to heat in a conventional toaster, toaster oven or microwave oven. The product is provided with a sauce formulated to prolong the shelf life of the product and to minimize moisture migration to the crust.

19 Claims, 2 Drawing Sheets

PIZZA POP-UP TOASTER PRODUCT

This application claims priority to provisional application 60/018,974 filed on Jun. 4, 1996 and provisional application 60/019,076, filed on Jun. 3, 1996.

FIELD OF THE INVENTION

This invention relates to a culinary food product, and more particularly, to a precooked frozen snack food that may be heated for consumption in a pop-up toaster, toaster oven or microwave.

DESCRIPTION OF THE PRIOR ART

Frozen pizza is one of America's top grocery food categories and sales of frozen pizza have been increasing each year with the overwhelming majority of frozen pizzas being sold in supermarkets. Cooking frozen pizza at home is economical, is preferred by households with small children, and saves time compared to the time required to fix a more conventional meal, or travel to a local pizzeria for take out pizza. Most frozen pizza is prepared by the consumer in a conventional oven, microwave or toaster oven.

Pizza pockets are also known which include a dough wrapper around a filling of sauce and cheese, which filling may also include other stuffing ingredients such as pepperoni, mushrooms or the like. These products are conventionally four to six inches in length, two to four inches in width and approximately an inch thick. These products take 15 to 20 minutes to prepare in a conventional oven which is desired for browning the crust wrapper. These products may also be cooked in a microwave in 3 to 7 minutes, but are generally bland, doughy and unappealing when surface crisping is not provided.

Sweet culinary toaster products are also known including such products as Pop Tarts® and Toaster Strudel™ which are intended to be prepared in a pop-up toaster or toaster oven in a conventional toaster cycle of two minutes or less. It has been determined in connection with research conducted on these products that products intended for this method of final heating before consumption should weigh less than 51 grams, have a dimension of less than 4.2 inches (10 cm) in the largest dimension and be no more than 0.6 inches (1.5 cm) in thickness. Pop-up toaster products meeting this physical criteria would fit in 90% of the toasters in the residential consumer market. These products are primarily sugar filled and do not have to contend with fillings having a substantial water content.

The art has yet to develop a toaster style pizza snack, principally because of the problems associated with water migration from the tomato sauce to the dough and the problems associated with the volume of tomato sauce and cheese necessary to provide a palatable snack with two layers of dough and a filling therebetween, wherein the layers of dough and filling do not exceed 0.6 inches (1.5 cm) in thickness.

SUMMARY OF THE PRESENT INVENTION

It is therefore an object of the present invention to provide a frozen precooked pizza pop-up snack food product that will fit within an average toaster opening, will retard water absorption by the crust and provide sufficient tomato sauce, cheese and flavorings to achieve a palatable and desirable food product.

It is also an object of the present invention to provide an optimal blend of a crust type product having individual serving size convenience and a desired level of fat content for a optimal consumer food product. The present invention provides a product with maximum product crispiness that may be prepared in a pop-up toaster, toaster oven or microwave. It is also an object of the present invention to provide a moderately reduced fat pizza with a healthy (25% fat by calorie) food product.

It is further an object of the present invention to provide a food product with a total weight of 1 to 3 ounces, and preferably 48 grams, measuring 8 to 10 centimeters and preferably 9.65 centimeters with a thickness of no more than 1.5 centimeters or 0.6 inches. A pizza pop-up snack of this type can be easily prepared for final consumption in a toaster within two minutes providing a crispy, soft and light crust with a full fat flavor, including stuffing items such as pepperoni, sausage, mushrooms, vegetables or the like. Larger diameter pizza products up to 20 cm in diameter may also be prepared in a like manner for consumer preparation in a toaster oven.

BRIEF DESCRIPTION OF THE DRAWINGS

For the purposes of illustrating the invention, there are shown in the drawings, the forms of the invention which are presently preferred; however, it should be understood that the invention is not necessarily limited to the precise arrangement, methods and devices illustrated.

DETAILED DESCRIPTION OF THE PREFERRED EMBODIMENT

The pizza pop-up food product of the present invention is designed to be sold in a precooked, frozen state for use by consumers who will heat the product for consumption in a conventional toaster, toaster oven or microwave.

Figure 1:
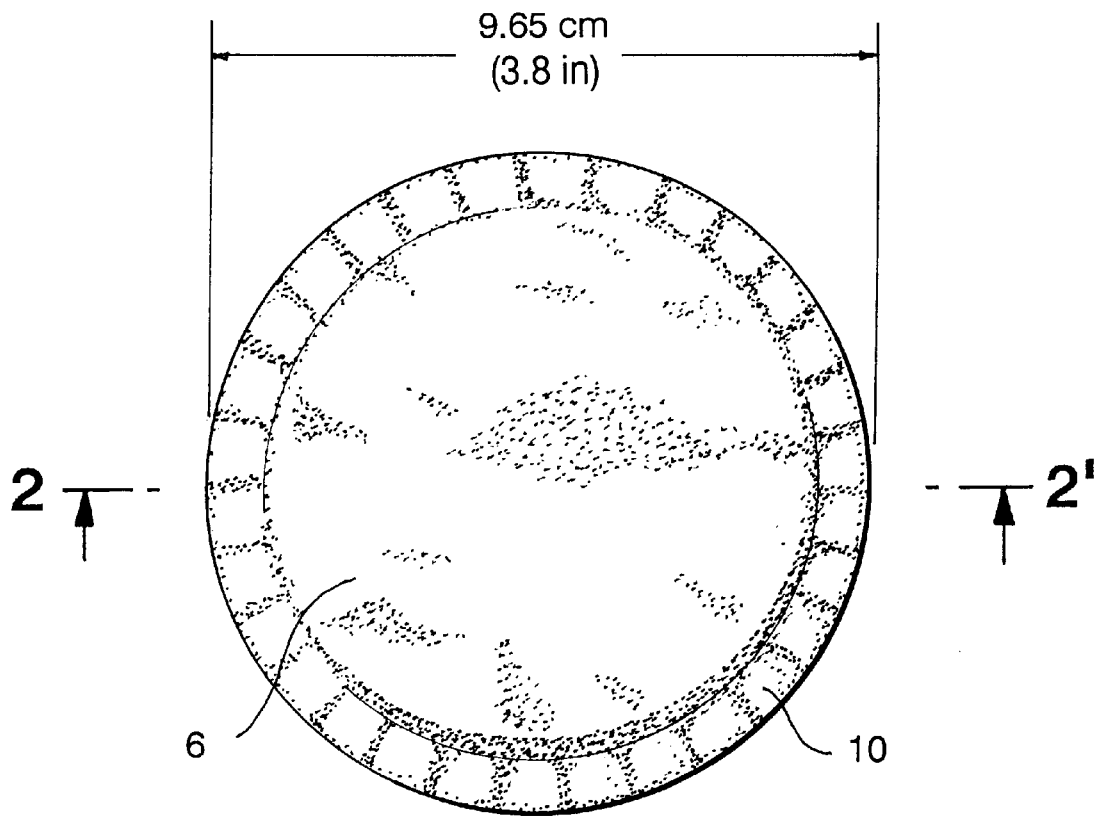
FIG. 1 is a plan view of the pizza pop-up toaster product of the present invention.
Figure 2:
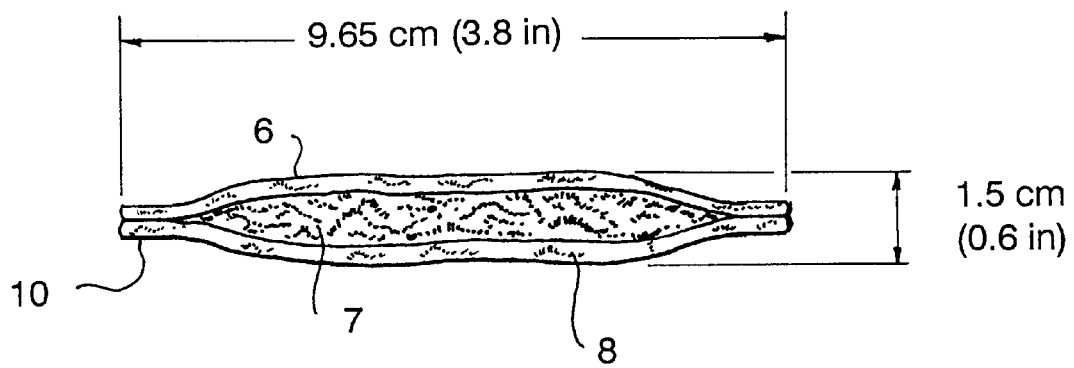
FIG. 2 is a cross section taken along section lines 2—2' of FIG. 1.

As illustrated in FIGS. 1 and 2, the pizza pop-up food product includes first and second dough layers 6,8 which are crimped about their perimeter 10, to enclose a filling 7 of tomato sauce, cheese and stuffing elements such as pepperoni, sausage, mushrooms, vegetables or the like. A lipid coating 11 is provided to the crust prior to filling to retard water absorption by the crust from the sauce and topping. After the planar dough members have been crimped, the layers define therebetween a planar cavity for holding the filling 7. After crimping, the product is then partially baked to form a crust from said dough and then flash frozen and packaged for sale to consumers. Each individual pizza pop-up is individually packaged to provide maximum customer convenience and to provide added barrier protection, and upon opening the package, the product is placed in a conventional toaster for a 1 to 2 minute toaster cycle, ending with the toaster "popping up" a hot, ready to eat pizza snack. The product may also be heated in a toaster oven or microwave.

The control of water at several stages of the products life is essential to the final integrity and mouth feel of the product. The food product is fully cooked, cooled and flash frozen in such a manner as to enhance taste and texture for the consumer. In the preferred embodiment, the product is 3 to 4 inches in diameter, no more than 0.6 inches in thickness (for pop-up toaster heating and is packaged after preparation in sealed pouches of high density polyethylene. Multiple product pouches, preferably 6 to 8 are then packaged in a consumer carton for display and sale.

CRUST

The dough for the crust of pizza pop-ups consists of a gluten source, salt, and water for the development of the dough. The gluten source is hard white wheat flour with moderate protein content of 10–15% and preferably 11–13%. Low-protein flour yields a dough with considerably less strength. Gluten levels less than 10.5% could cause rupture of the product's crust during handling by the consumer. The level of gluten is essential to the integrity of the product and also affects the amount of leavening to be used. For this product some leavening is desired, while extreme leavening should be avoided. Excess volume of the product's crust could cause the maximum size limits to be exceeded. Increased gluten levels also prevent uptake of water by the crust. Therefore, the optimal balance between dough strength and increased leavening should be the operative considerations when selecting a flour.

The dough is preferably formed with hydrogenated vegetable shortening for layering and flakiness. Although shortening usually imparts increased volume in baked products, a fat source is important to the crust of the pizza for maintaining the desired crispy layers. The use of shortening also enables the dough to be manipulated into more exact shapes and helps to prevent moisture uptake in the finished crust.

Maltodextrin is included in the crust formulation to increase the browning (carmelization) of the crust during baking and to add the slightly sweet taste of malt. The maltodextrin used is 10 DE (dextrose equivalents). Use of higher DE maltodextrins could lead to excessive sweet taste.

The baking powder added to the crust is a single acting baking powder containing the leavening acid, monocalcium phosphate monohydrate. The leavening agent has been added at up to 1% and preferably at 0.3%, a level which will elute the proper amount of carbon dioxide to yield a crust with only slight volume. The leavening of the product of the present invention, which has a limit to its volume, requires a balance between preventing excess volume and producing a product that is flat like a cracker dough. The fast-acting monocalcium phosphate monohydrate will release most of the carbon dioxide prior to the setting of the dough in the oven, but will still provide adequate leavening of the crust during baking.

Calcium propionate has been added to the crust formulation to prevent the growth of mold. It will prevent mold growth on the product for up to 11 days at room temperature. The amount of calcium propionate (0.06%) in the crust is sufficient for the desired shelf life.

Water is present for mixing the dough as 20% to 40% by weight of the dough, and preferably about 35% of the dough or 22% of the final product. Likewise, flour may be present as 56% to 78% by weight of the dough, and preferably 64% by weight of the dough, or 41% of the product by weight. The preferred range and mix of dough ingredients are as follows:

| Ingredients | (% of Product Wt.) | (preferred) |
| --- | --- | --- |
| Flour | 36–46% | 41.00% |
| Water | 17–27.5% | 22.66% |
| Hydrogenated Vegetable Shortening | .95–1.7% | 1.13% |
| Salt | .00–.80% | 0.41% |
| Sugar | .10–.90% | 0.41% |
| Maltodextrin | .25–.90% | 0.53% |
| Baking Powder | .05–.50% | 0.20% |
| Calcium Propionate | 0.0–.06% | 0.04% |

LIPID COATING

A fine spray of a lip such as acetylated monoglyceride is applied to the inside surface of the formed crust prior to product assembly. While acetylated monoglyceride is preferred, any lipophilic oil, such as coconut oil, may be used. This prevents water migration from sauce to the crust during processing and during heating. The monoglyceride, at the level used, imparts no flavor. A barrier will be formed on the inside of the crust by the lipophilic monoglyceride. This barrier maintains adequate integrity during processing and storage since the interior of the product will not be disturbed (stirred) after the crust has been crimped. Moisture from the sauce is prevented from migrating into the crust by the lipid layer of monoglyceride. The lipid coating is not applied to the area of the dough to be crimped, since it will inhibit binding of the dough during the baking thereof and cause rupture of the crimp during subsequent handling.

| Ingredients | (% of Product (Wt.) | (preferred) |
| --- | --- | --- |
| Acetylated Monoglyceride | 0–1.0% | 0.20% |

SAUCE

The tomato sauce used to fill the crust of the pizza pop-up contains several ingredients which function to prolong the shelf life of the product. The major issues to be considered when formulating the sauce are: the solids level and water binding ability necessary to reduce water activity and to minimize moisture migration to the crust, pH to increase microbial stability, and texture to maintain a palatable product.

Tomato concentrate serves as the main ingredient of the sauce, within a range of 57% to 89% by weight of the sauce as tomato paste, and preferably 68% tomato paste and 17% water by weight for the sauce, or 9.5% tomato paste and 2.4% water, by weight, with respect to the product as a whole. These levels, together with the other solids such as the corn syrup solids, ensure a proper solids ratio and maintain a low pH for the pizza sauce. Soybean oil is included in the sauce to provide not only some flavor, but also a mouth feel that is pleasant in an acid product. This oil is present in the sauce at 3% to 5% by weight of the sauce, and is preferably deodorized and winterized. Because of the intended storage for the final product, no antioxidant is needed to ensure the planned shelf life. Salt, sugar, and corn syrup solids are added to impart flavor to the sauce and to boost the soluble solids level. These ingredients decrease the water activity to below 0.84, which helps maintain a product that is microbially stable. In addition, the high solids level of the sauce reduces moisture migration into the crust upon thawing.

Modified food starch is added to the sauce to tie up water and prevent the migration of moisture to the crust. The starch used is a cross-linked waxy cornstarch. The cross-linked modification and branched nature of this polymer provide freeze-thaw stability which prevents thaw-drip of the product when placed in the toaster. By using this specific modified starch product, water is maintained in the sauce even after several freeze-thaw cycles.

| Ingredients | (% of Product Wt.) | (preferred) |
|---|---|---|
| Tomato Paste | 7.0–12.0% | 9.47% |
| Water | 1.5–4.5% | 2.37% |
| Soybean Oil | .00–2.0% | 0.52% |
| Salt | .00–1.5% | 0.35% |
| Sugar | .10–.80% | 0.30% |
| Corn Syrup Solids | .05–.70% | 0.24% |
| Dried Onions | .05–35% | 0.18% |
| Extra Virgin Olive Oil | .00–2.0% | 0.15% |
| Romano Cheese | .00–1.6% | 0.11% |
| Modified Food Starch | .05–4.0% | 0.10% |
| Spices | .05–.35% | 0.05% |
| Natural Garlic Flavor | .05–.35% | 0.01% |

STUFFING INGREDIENTS

At least one stuffing ingredient is added to the sauce to provide nutritive value, desired mouth feel and taste, and to satisfy consumer demand for specific types of conventional toppings, here provided as stuffing ingredients. The principle stuffing ingredient is mozzarella cheese, which may be part-skim mozzarella to provide the desired fat level (25% of total calories as fat) necessary to meet current consumer demand.

In the preferred embodiment, at least one other stuffing ingredient is provided, which may be other cheeses, pepperoni, sausage, mushrooms, peppers, onions, or mixed vegetables. The desired ratio of cheese to other ingredient stuffing is approximately 1:1, with a total combined weight of the stuffing ingredients totaling 15–25% of the total product weight, and preferably 20%. the relative ratios of stuffing ingredients, is to some extent, driven by regulatory issues which require a minimum of 10% by weight for labeling requirements. Within this context, the desired ratio of edible filling to sauce ranges from about 1:1 to 3:1, and the ratio of edible filling to dough ranges from 1:2 to 1:4. One particularly desirable stuffing ingredient combination is set forth below:

| Ingredients | (% range) | (% of Product Wt.) |
|---|---|---|
| Part-Skim Mozzarella | 2–15% | 9.57% |
| Pepperoni | 0–15% | 10.00% |

NUTRITIONAL FACTS

Approximate analysis of the moisture, ash, protein, carbohydrate (by difference) and fat were completed using 1995 Association of Official Analytical Chemists Guidelines (AOAC 935.39, Nutritional Label—Appendix D).

Under this analysis, a serving size (as determined under the N.L.E.A.) included three pop-up pizza products which totaled 144 grams. The following nutritional information was then obtained per serving:

| Calories 320, Calories from fat 70, | |
|---|---|
| | % Daily Value |
| Total Fat 7 g | 11% |
| Saturated Fat 3 g | 15% |
| Cholesterol 10 mg | 3% |
| Sodium 590 mg | 25% |
| Total Carbohydrate 50 g | 17% |
| Dietary Fiber 2 g | 8% |
| Sugars 3 g | |
| Protein 12 g | |

In designing the pizza pop-up product of the present invention, the following heat transfer considerations were assumed. The following calculations follow the preferred methodology set forth in *Introduction to Food Engineering*, Singh, R. P. and Heldman, D. R. (1993) published by Heldman Academic Press, Inc., San Diego, Calif.

Consumer heating of the product in the middle of a pop-up toaster with the largest dimensions was assumed, with convection of the heat by air in the toaster oven to the dough layers wherein the heat equaled 25 watt/m$^2$°C.

Conduction through the dough and topping layers were then assumed with the thermal conductivity (k) for the dough and topping layers, which conduction was calculated as follows:

(k) = 2.44*xw+0.26(1-xw)

where k=thermal conductivity in W/m° C.

xw mass fraction of water xw dough=0.036 and xw toppings=0.414*(0.935)+0.352*(0.65)+0.234*(0.50)=0.733 where 0.414=fraction of sauce; 0.935=xw in sauce;

0.352=fraction of cheese; 0.65=xw in cheese;

0.234=fraction of meat; 0.50=xw in meat

Therefore, k(dough)=1.045 W/m° C. and k(topping)=1.858 W/m° C. Thickness of dough=0.003 m and topping layer=0.0045 m. Assuming the outside temperature of the pizza is −18° C. k(overall)=(0.6658)*(1.045)+(0.3342)*(1.858)=1.317 W/m° C. Cp (heat capacity)overall=(0.1384)*(3.7)+(0.6658)* (1.8)+(0.1958)*(0.6(3.3)+0.4(2.8))=2.32 kJ/kg°C.

where 3.7 kJ/kgC=heat capacity of dough 1.8 kJ/kgC=heat capacity of sauce 3.3 kJ/kgC=heat capacity of cheese 2.8 kJ/kgC=heat capacity of meat Calculating the Biot number: $N_{Bi}$=hD/k, assuming D=half of the thickness of the pizza=0.0075 m $N_{Bi}$=0.25. Therefore, 0.1<$N_{Bi}$<40, so finite internal and surface resistance to heat transfer is assumed. Calculating the Fourier number:$N_{Fo}$= kt/pCpD$^2$=(1.317*90)/( 1000*1200*2.32*0.0075$^2$) where 1200 kg/m$^3$=density of pizza; 90=number of seconds the pizza is in toaster; 1000=conversion from kJ to J. So, $Nf_{fo}$=0.757 and k/hD=1.317(25*0.0075)=7.024. For a sphere with finite internal and surface resistance to heat transfer, Ta-T/(Ta-Ti)=260-T/(260-(-18)) where Ta=ambient temperature=500° F. or 260° C.

Ti=initial temperature pizza=0° F. or −18° C.

T=final tmperature inside pizza

The chart published on page 195 of *Introduction to Food Engineering* indicates Ta-T/(Ta-Ti)=0.70, therefore T=149.7° F. The final temperature inside the pizza pop-up after toasting for 90 seconds is 149.7° F which is out of the microbial "danger zone" (40–145° F.) and is hot enough for consumer acceptance. The forgoing calculations provide an added degree of safety since most home freezers operate within a range of 10–25° F.

PRODUCT PREPARATION

Figure 3:
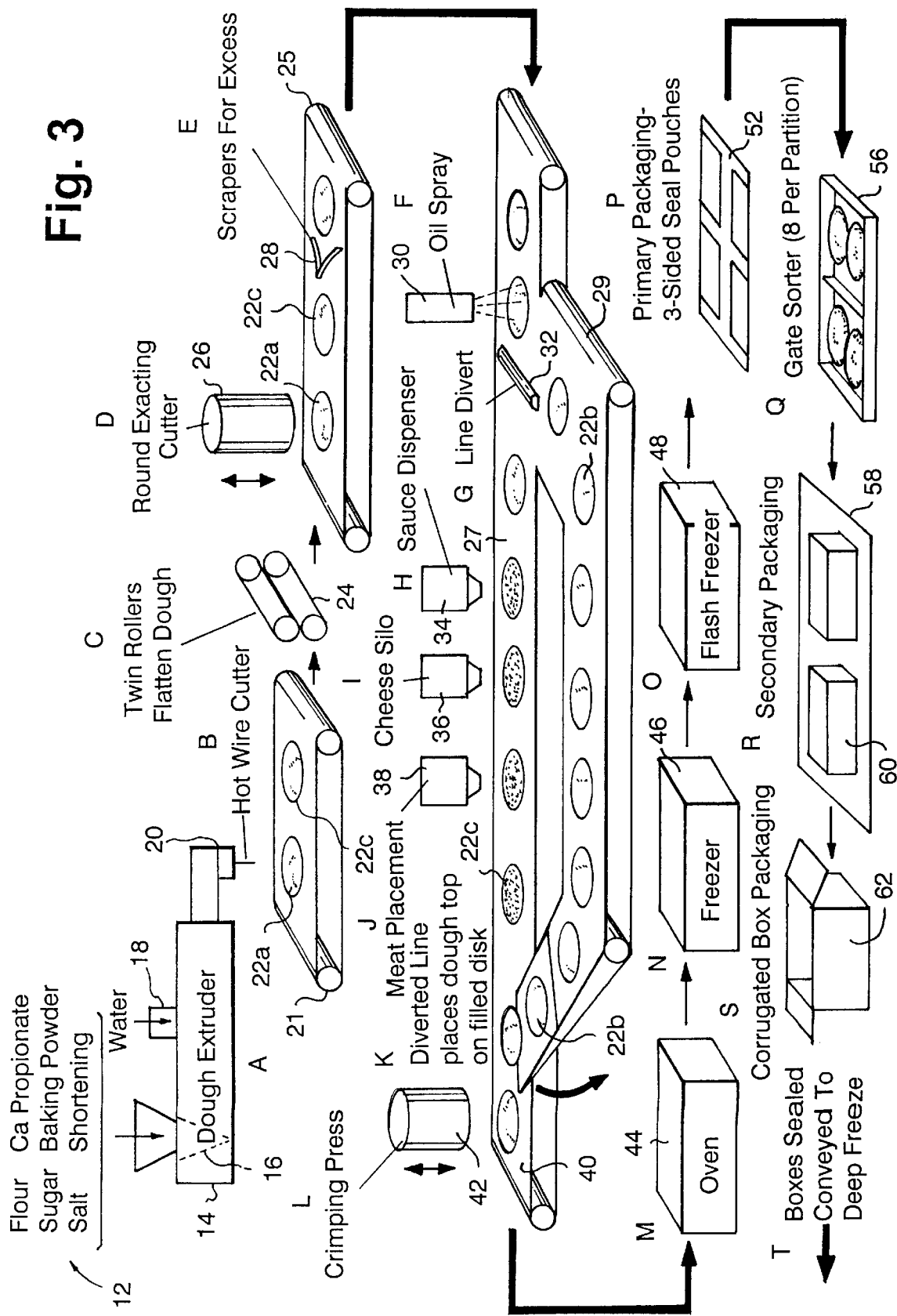
FIG. 3 is a diagrammatic illustration of a manufacturing line for preparing the pizza pop-up toaster product of the present invention.

FIG. 3 is a schematic illustration of one method and production line capable of producing the product of the present invention.

The dry ingredients 12, including flour, sugar, salt, calcium propionate, baking powder and shortening, for the dough are metered into an extruder 14 for continuous mixing by blades 16. Then the water is added as indicated at 18 and the mixture is continuously kneaded in the extruder. A 3.7 in. (9.4 cm) die is used to form the dough into a cylindrical shape. It is important not to over-extrude the dough because of leavening issues. If less gluten is formed, then less leavening occurs; therefore, the dough should not remain in the extruder any longer than necessary for adequate mixing. The final product must remain thin enough to fit in a toaster.

A hot wire cutter 20 is provided to divide the dough from the extruder. The hot wire passes through the extruded dough cylinder at continuous time intervals which is dependent on extruder capacity. Each secured dough "biscuit" should be 12–16 g and preferably 15 g. The dough "biscuits" 22a, 22b, then drop onto a conveyor belt 21 which spaces them at regular intervals as the belt is advanced.

The dough "biscuits" 22 are then fed through the twin rollers 24 that have adjustable nip spacing. The dough biscuits are flattened into round disks of uniform thickness, preferably approximately 1 to 6 mm.

The dough biscuits 22 are evened out with a round exacting cutter 26 having a circular cutting tube on conveyor 25. The desired final diameter of the product is 8 to 10 cm. The cutter is made from a non-stick material to prevent any dough build-up. The cutter is necessary to avoid any problems down the line with distorted dough disks.

Scrapers 28 are provided to remove the excess dough, cut from the edges, from the conveyor belt, and divert them to dough rework or to waste management as desired.

The rounded dough blanks or biscuits 22 are then transferred from conveyor 25 to conveyor 27. It is understood that FIG. 3 is a diagrammatic illustration which has illustrated the transfer vertically in order to present the entire process in a single figure. In the actual apparatus, contiguous horizontal conveyors would be used.

The dough disks 22 are sprayed with acetylated monoglyceride by a sprayer 30 that is fitted with a 2.5 in. (6.4 cm) diameter spray guard to assure the oil remains within the disk center, and does not coat the area of the dough to be crimped. In practice a 1 cm annular crimping zone on an 8 to 10 cm diameter dough member around the outer perimeter of the dough members was found to be sufficient to provide intermixing of the dough members during the crimping step. The dough needs a moisture barrier to prevent seepage of water present in the topping ingredients. The acetylated monoglyceride was chosen because it is lipophilic, it is stable and it resists rancidity.

A line diverter 32 is used to split the biscuits into first and second or upper and lower dough members 22a and 22b. Half of the dough members 22a travel to the topping station, while the other half 22b remain untouched to serve as the top of the pizza pop-up product. The diverted line rejoins the straight conveyed line at point K.

The sauce dispenser 34 includes a cold jacketed hopper in which the sauce is continuously stirred. The sauce is metered out into the center of the dough disk at 22c. The sauce is dispensed with a computer controlled electric eye nozzle dispenser. Operators may be needed in the topping area to monitor the disk/dispensing system, to prevent spillage onto the belt and to eliminate skewed topping placement. The sauce tank is refilled once per shift by pumping sauce from the drums to the cold jacketed hopper.

While many stuffing ingredients may be used to satisfy consumer demand, the principle pizza stuffing ingredient is shredded cheese or a mixture of cheeses (cold) which are metered out of a cheese silo 36. The cheese is kept in a cold jacketed agitated hopper with a funneled tip that allows a pre-measured amount of cheese to be released when a dough disk is beneath it. The funnel tip also uses a computer controlled electric eye for metering the cheese silo is filled once per shift by dumping fresh cheese into the silo. The cheese must be kept cold and agitated to reduce the possibility of clumping.

Meat or other stuffing ingredients are also dispensed from a cold jacket hopper at silo dispenser 38. The meat(cold and pre-cooked) or other stuffing ingredients are metered out by a computer controlled electric eye. The stuffing ingredients are kept in an agitated hopper with a funneled tip that allows a pre-measured, amount of stuffing to be released when a dough disk is beneath it. The stuffing hopper is refilled once per shift by dumping fresh ingredients into the hopper. The ingredients must be kept cool and agitated to reduce the possibility of clumping. While pepperoni is the preferred stuffing ingredient, other conventional ingredients may also be used such as mixed varieties of cheeses, sausage, mushrooms, onions, peppers and other assorted mixed vegetables.

The diverted line conveyor 29 flips the blank dough members 22b onto the topped disks 22c as illustrated at 40. The flipping action may be created naturally as the disk comes to the end of the conveyor, or may be accomplished with a mechanical arm, as illustrated. Operators may be needed to insure alignment of the flipped dough members 22b with the topped dough members 22c. The timing on the belts is used to match up the dough members so that proper spacing between members is maintained.

The pizza pop-ups are edge pressed and crimped using a crimping press 42 to eliminate leakage in the final product. The crimping press crimps the product about the outer perimeter of the superimposed planar dough members to define a planar filling cavity therebetween. Also, small air holes are pricked onto the top of the pizzas during the press to allow vapor to escape.

The pizzas are then baked on a continuous production line conveyor in an oven 44, at 200 to 400° C., with a residence time of 2–10 minutes, and preferably at 260° C. for 4 minutes is desired to bake the dough to the desired crust. Preferably, a hot air convection or impingement oven is used to ensure the desired degree of product browning. Browning is desired for those consumers who prefer to microwave the product. The browning (carmelization), however, should be close to complete, and the additional cooking step provided by a pop-up toaster or toaster oven enhances the product appeal and mouth feel.

After baking, the hot pizzas are slowly cooled, cooler 46 to ensure less moisture accumulation on the crust, and to prevent water separation or formation in the filling. The cooled pizzas are then flash frozen in a flash freezer 48 to reduce the diameter of ice crystal formation.

The individual pizza pop-ups are then packaged horizontally in form-fill-seal pouches as illustrated at 52, the pouches are made from one web of HDPE material 54.

The individually wrapped pizzas are dropped into a gate sorter compartment 56 that fits 8 pizzas. After eight pizzas drop into the compartment, the belt moves forward and an empty compartment picks up the next 8 pizzas.

The 8 pizzas sorted at 56 are cartoned in a rectangular folded paperboard package at 58. The carton is then heat sealed closed.

The individual cartons 60 are then boxed as indicated at 62. The boxes are taped shut and then transported on a belt to a large storage freezer prior to shipping to a retail point of sale.

While the invention has been particularly shown and described with respect to the preferred embodiments thereof, it will be understood by those skilled in the art that the foregoing and other changes in form and details may be made therein without departing from the scope of the invention, which should be limited only by the scope of the appended claims.

We claim:

1. A pre-cooked pizza food product, said product adapted to be heated for consumption by a consumer in a toaster, toaster oven or microwave, said product comprising:
    (a) first and second planar crust members, said planar members not exceeding 6 mm in thickness, said crust formed from a high strength, low volume dough having flour with a protein gluten content of 10–15%, water, shortening and a leavening agent, said first and second planar members having a perimeter and inner and outer surfaces, said planar members superimposed with their inner surfaces adjacent one another and crimped together about their perimeters to define a planar pocket therebetween;
    (b) a high solid, low-water activity tomato based sauce said sauce having a water activity less than 0.85, said sauce formed from 57 to 89 weight percent of tomato paste, water, oil, and a crosslinked modified food starch, said sauce providing enhanced freeze-thaw stability and inhibiting water migration to the dough members;
    (c) a lipid barrier coating on the inner surfaces of said first and second planar dough members;
    (d) at least one stuffing ingredient, the total ratio of said stuffing ingredient(s) to said sauce being from about 1:1 to 3:1 and the weight ratio of said stuffing ingredient(s) and sauce to said dough members being from 1:2 to about 1:4.

2. A pre-cooked pizza food product as claimed in claim 1, wherein said tomato sauce is 60% to 90% tomato paste and 10%–25% water, with a total water activity of less than 0.85.

3. A pre-cooked frozen pizza food product as claimed in claim 1, wherein said dough contains maltodextrin to increase the browning of the outer surfaces of the crust members of the product.

4. A pre-cooked pizza food product as claimed in claim 1, wherein said stuffing ingredient includes mozzarella cheese.

5. A pre-cooked pizza food product as claimed in claim 4, wherein said mozzarella cheese is part-skim and is present in amount of 5% to 25% of the product by weight.

6. A pre-cooked pizza food product as claimed in claim 4, wherein said stuffing includes a second ingredient selected from the group of pepperoni, sausage, mushrooms, onions, peppers or mixed vegetables.

7. A pre-cooked pizza food product as claimed in claim 6, wherein said stuffing ingredients include part-skim mozzarella cheese and pepperoni, with said part skim mozzarella being 5% to 15% by weight of the product and said pepperoni being 10% to 15% by weight of the product.

8. A pre-cooked pizza food product as claimed in claim 1, wherein said flavorings in said sauce include salt, sugar, dried onions, romano cheese and garlic, said flavorings being less than 2% by weight of said product.

9. A pre-cooked pizza product of high freeze-thaw stability that enables toaster preparation by a consumer, said product comprising:
    (a) an edible high-strength, low-volume pizza dough for sheathing a pizza sauce and at least one edible filling, said dough ingredients being;
        (i) about 56 to about 78 weight percent flour.
        (ii) about 20 to about 40 weight percent filtered water;
        (iii) about 1 to about 3 weight percent vegetable shortening;
        (vi) the remainder being about 1 to about 4 weight percent salt, sugar, maltodextrin, baking powder and calcium propionate, the weight ratios of said flour, said filtered water, said vegetable shortening, said maltodextrin, said baking powder and said salt, sugar and calcium propionate providing dough strength and leavening;
    (b) said pizza sauce having a plurality of ingredients said sauce having a water activity level of less than 0.85. said sauce including;
        (i) about 57 to about 89 weight percent of a tomato paste concentrate;
        (ii) about 10 to about 25 weight percent of filtered water;
        (iii) about 3 to about 5 weight percent oil;
        (iv) a modified food starch; with
        (v) the remainder being about 4 to about 8 weight percent salt, sugar, corn syrup solids, spices and flavorings, the weight ratios of said ingredients providing a water activity below 0.85 to the pizza sauce;
    (c) said at least one edible filling including at least a quantity of edible cheese, wherein the weight ratio of said edible filling to said pizza sauce ranges from about 1:1 to about 3:1 and the weight ratio of said edible filling and pizza sauce to said pizza dough sheath ranges from about 1:2 to about 1:4.
    (d) a barrier lipid coating applied to said pizza dough to minimize water migration to said dough from said sauce or said edible filling.

10. A pre-cooked pizza product of high freeze-thaw stability as claimed in claim 9, wherein said edible filling includes a second ingredient selected from the group of pepperoni, sausage, mushrooms, onions, peppers or mixed vegetables.

11. A pre-cooked pizza product of high freeze-thaw stability as claimed in claim 10, wherein said edible filling includes part-skim mozzarella cheese and pepperoni, with said part skim mozzarella being 5% to 15% by weight of the product and said pepperoni being 10% to 15% by weight of the product.

12. A pre-cooked pizza product of high freeze-thaw stability claimed in claim 9 wherein said modified food starch in said sauce is a cross-linked waxy corn starch.

13. A pre-cooked pizza product of high freeze-thaw stability as claimed in claim 9 wherein said flour in said dough is a hard wheat flour having a protein content of about 10 to about 14 weight percent.

14. A pre-cooked pizza product of high freeze-thaw stability as claimed in claim 9 wherein said vegetable shortening in said dough is a hydrogenated vegetable shortening.

15. A pre-cooked pizza product of high freeze-thaw stability as claimed in claim 9 wherein said baking powder in said dough is monocalcium phosphate monohydrate.

16. A pre-cooked pizza product of high freeze-thaw stability as claimed in claim 9 wherein said lipid coating is acetylated monoglycerides being about 50 to about 100 micro meters in thickness bearing saturated fatty acid residues derived from C12 to C18 fatty acids.

17. A pre-cooked pizza product of high freeze-thaw stability as claimed in claim 9 wherein said is dough includes first and second planar members, each member being 12 to 24 grams in weight.

18. A pre-cooked pizza product of high freeze-thaw stability as claimed in claim 17 wherein said dough members are rolled to a thickness of 1 to 6 mm.

19. A pre-cooked pizza product of high freeze-thaw stability as claimed in claim 18 wherein said first and second members are crimped together with said sauce and edible topping therebetween.

* * * * *